Patented Oct. 26, 1926.

1,604,930

UNITED STATES PATENT OFFICE.

ROBERT MEZGER, OF STUTTGART, GERMANY, ASSIGNOR TO THE FIRM: PAUL LECHLER, OF STUTTGART, GERMANY.

METHOD OF TREATING PAINTS.

No Drawing. Application filed September 7, 1923, Serial No. 661,527, and in Germany August 1, 1922.

My invention refers to paints and more especially to means for preventing a film of dried paint from cracking and tearing. It is an object of my invention to provide means for attaining this end in a particularly simple and effective manner.

According to the present invention the paint, which as a rule consists of a pigment and a vehicle or carrier of some suitable kind, preferably of a liquid character, contains the hydroxid of one or several of the metals of the iron group (which group comprises, besides iron, aluminum and chromium), a small quantity of such hydroxid, which has a flocculent character, being admixed with the paint in a state of extremely fine subdivision, such as can be obtained by causing the hydroxid to be precipitated, for instance from a solution of a salt, right in the paint itself. The finely divided flocculent hydroxid will form an extremely thin network of metal oxid in the paint after drying, this oxid network forming a strong protective coating which effectually prevents the film of dry paint from tearing and cracking. In 100 parts by weight of the paint not more than one part and in the majority of cases 0.2 parts and even less of the metal compound will be present.

In order to carry my invention into practice, I may proceed in different ways.

I may, for instance, mix the paint, ready for use, by vigorous stirring with a highly concentrated solution of a salt of a metal of the iron group, such as aluminium sulfate, thereby forming an emulsion in which the salt solution is finely subdivided. By adding under stirring the required quantity of a highly concentrated solution of an alkali hydroxid, the metal hydroxid is formed which, being insoluble, is precipitated as an extremely fine flocculent constituent.

I may for instance add to 1,000 grams of an oil paint 10 grams of a watery solution containing 20 per cent aluminium sulfate (calculated free of crystal water). The mixture is stirred vigorously so that an emulsion is formed. To this emulsion there are added under stirring 4.8 grams of a watery solution containing 30 per cent caustic soda. The solution of sodium sulfate, which forms a separate layer, is removed.

Another method of obtaining the novel product consists in admixing with the paint a complex compound of a hydroxid of a metal of the iron group (iron, aluminum, chromium) with an organic oxy-acid or other oxy-compound, such as tartaric acid and citric acid or sugar, starch and the like. After some time the metal hydroxid itself will separate out in the paint and will become insoluble while the paint is drying. To 1,000 grams of an oil paint a mixture of 10 grams of a watery solution containing 20 per cent aluminium sulfate (calculated free of crystal water) and 8.3 grams of a watery solution containing 29.6 per cent Rochelle-salt (calculated free of crystal water) is added under vigorous stirring. To the emulsion thus formed are added under stirring 4.8 grams of a watery solution containing 30 per cent caustic soda. The water which separates off is removed in any suitable manner.

Still another method of making a stable paint according to this invention consists in mixing with the paint the hydrosole of one or several oxids of the metals of the iron group (iron, aluminium and chromium). In the emulsion thus formed the metal oxid precipitates of itself in a state of extremely fine subdivision.

Thus for instance 20 cubic centimeters of an aluminium hydroxid hydrosole solution are admixed under stirring with 1,000 grams of an oil paint. The water which settles after some time is removed in any suitable manner. The hydrosole solution is obtained in a well known manner, for instance by precipitating 50 cubic centimeters of aluminium chloride solution, containing 1.124 grams of aluminium oxid, with ammonia. The precipitate is quickly rinsed with water and is heated to boiling with 250 cubic centimeters of water. To the boiling mixture 20 cubic centimeters of a 1/20 normal hydrochloric acid are added drop by drop. The colloidal solution thus obtained is carefully concentrated to a volume of 40 cubic centimeters, one half of which is added to 1000 grams of the paint, as above described.

If paints containing fatty oils are treated according to this invention, the water admixed with them will settle on top of the paint. On the other hand, in bituminous paints containing tarry or asphalt-like constituents the water will remain in the emulsion and will evaporate while the paint is drying.

I wish it to be understood that I do not desire to be limited to the exact proportions and operations above described, as many modifications will occur to a person skilled in the art.

I claim:

The method of treating paint in order to increase its flexibility upon hardening which consists in adding to the paint containing a non-aqueous vehicle and a base, a small amount of a soluble salt of a metal of the iron group and precipitating in said paint an insoluble hydroxide of said metal by the addition of the theoretical amount of an alkali hydroxide, without adding an amount of water as large as the amount of said non-aqueous vehicle.

In testimony whereof I have affixed my signature.

Dr. ROBERT MEZGER.